(12) United States Patent
Igarashi et al.

(10) Patent No.: US 8,628,858 B2
(45) Date of Patent: Jan. 14, 2014

(54) SILICONE RUBBER COMPOSITION FOR OPTICAL SHEET, AND OPTICAL SHEET

(75) Inventors: Minoru Igarashi, Annaka (JP); Tsutomu Nakamura, Annaka (JP); Atsuo Ito, Annaka (JP); Tomoyoshi Furihata, Annaka (JP); Hyung-Bae Kim, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/338,396

(22) Filed: Dec. 28, 2011

(65) Prior Publication Data

US 2012/0165451 A1    Jun. 28, 2012

(30) Foreign Application Priority Data

Dec. 28, 2010   (JP) .................................. 2010-291823

(51) Int. Cl.
*B32B 9/04* (2006.01)

(52) U.S. Cl.
USPC ........ 428/447; 250/201.1; 362/612; 524/403; 524/405; 524/492; 524/588; 525/477; 525/478

(58) Field of Classification Search
None
See application file for complete search history.

(56) References Cited

U.S. PATENT DOCUMENTS

| | | | | |
|---|---|---|---|---|
| 3,677,877 | A | * | 7/1972 | Metevia et al. ............... 428/409 |
| 4,454,288 | A | * | 6/1984 | Lee et al. ..................... 524/588 |
| 6,815,520 | B2 | | 11/2004 | Yoneda et al. |
| 7,838,117 | B2 | | 11/2010 | Miyoshi et al. |
| 7,951,891 | B2 | | 5/2011 | Miyoshi et al. |
| 8,084,529 | B2 | * | 12/2011 | Hasegawa et al. ............ 524/430 |
| 2009/0121180 | A1 | * | 5/2009 | Tsubokawa et al. ....... 252/182.3 |

FOREIGN PATENT DOCUMENTS

| | | |
|---|---|---|
| JP | 2002-265787 A | 9/2002 |
| JP | 2003-059321 A | 2/2003 |
| JP | 2003-258291 A | 9/2003 |
| JP | 2006-202952 A | 8/2006 |
| JP | 2006-342200 A | 12/2006 |
| JP | 2009-229581 A | 10/2009 |
| WO | WO 2008/082001 * | 7/2008 |

OTHER PUBLICATIONS subject matter from the URL http://www.intl-lighttech.com/applications/light-measurement/how-light-behaves-chapter-3-light-measurement-handbook.*

* cited by examiner

*Primary Examiner* — Marc Zimmer
(74) *Attorney, Agent, or Firm* — Westerman, Hattori, Daniels & Adrian, LLP

(57) ABSTRACT

Disclosed is a millable type silicone rubber composition including as an essential components:
  (A) 100 parts by weight of an organopolysiloxane represented by the following average compositional formula (I) and having a polymerization degree of at least 100;

$$R^1{}_a SiO_{(4-a)/2} \quad (I)$$

wherein $R^1$ are, identical or different, unsubstituted or substituted monovalent hydrocarbon groups, and a is a positive number of 1.95 to 2.05;
  (B) 70 to 150 parts by weight of fumed silica having a specific surface area of more than 200 $m^2/g$;
  (C) 0.1 to 30 parts by weight of an organohydrogenpolysiloxane having at least two hydrogen atoms bonded to silicon atoms in one molecule; and
  (D) 0.1 to 10 parts by weight of a hydrosilylation reaction catalyst.

8 Claims, 1 Drawing Sheet

SILICONE RUBBER COMPOSITION FOR OPTICAL SHEET, AND OPTICAL SHEET

CROSS-REFERENCE TO RELATED APPLICATION

This non-provisional application claims priority under 35 U.S.C. §119(a) on Patent Application No. 2010-291823 filed in Japan on Dec. 28, 2010, the entire contents of which are hereby incorporated by reference.

TECHNICAL FIELD

The present invention relates to a silicone rubber composition for an optical sheet particularly used for forming an optical sheet for a concentrating solar cell or an optical sheet for an LED backlight device, and an optical sheet composed of a cured product of the silicone rubber composition.

BACKGROUND ART

As a photovoltaic power generation panel system, there has been frequently used a flat plate system in which solar cells generally called cells are laid over a sunlight receiving surface. Since the solar cells to be laid over according to the light receiving area are expensive, it has been difficult to lower the cost of the photovoltaic power generation panel. In view of this, a concentrating type photovoltaic power generation panel has been developed in which the light at the sunlight receiving surface is concentrated (condensed) onto small-diameter solar cells. In the concentrating type photovoltaic power generation panel, light is concentrated by a factor of several hundreds (see, for example, Patent Document 1: JP-A 2003-258291), whereby the number of solar cells to be used can be remarkably reduced as compared with the flat plate system. However, the concentrating type photovoltaic power generation panel in which light is concentrated by a factor of several hundreds has a problem in that biaxial tracking for orienting the sunlight receiving surface to the sunlight direction is needed. Further, the trestle for the tracking has to be robust, taking into consideration the outdoor use of the panel; the installation cost of the trestle would cancel out the initial cost-basis merit of a marked reduction in the number of expensive solar cells to be used. For this reason, a system in which monoaxial tracking is adopted or no tracking is conducted, for the purpose of facilitating the sunlight tracking and reducing the cost, is proposed at present. In this system, a resin-made Fresnel lens or prism type sheet is disposed for the condenser lens so that externally coming incident light is condensed into the direction normal to the light receiving surface, then the condensed light is reflected, transmitted or refracted into a predetermined direction, and the distributed light is further guided by total reflection to finally enhance the incident light energy density (see, for example, Patent Document 2: JP-A 2009-229581).

In order that the photovoltaic power generation panel becomes wide spread as a measure for solving the global warming problem, a cost reduction at such a level as to compete with the power cost in the network commercial power system should be achieved. The cost for the photovoltaic power generation panel is said to be 100 yen/Wp, and, accordingly, there is a demand for excellent durability as well as low material cost and low processing cost for the shaping of the sunlight concentrating (condensing) section such as Fresnel lens or prism lens.

As a material for the sunlight concentrating section such as the resin-made Fresnel lens or prism lens, in general, acrylic resin, polymethyl methacrylate resin and polycarbonate resin are used. In the concentrating solar cell panel required to show long-term durability of more than twenty years under sunlight, however, silicone resins higher than these general-purpose resins in resistance to UV rays is suitably used. In the case of processing the shape of the sunlight concentrating section such as Fresnel lens or prism lens, however, a low-productivity working process is adopted in which a resin is injected into a mold by injection molding and the product is taken out after the molding, like in the cases of the acrylic resin for general-purpose use. This results in a raised production cost. For this reason, it has been difficult to put the simple, light-weight concentrating photovoltaic power generation panel to practical use by using the sunlight concentrating section such as resin-made Fresnel lens or prism lens.

On the other hand, attendant on the trend toward higher functions of cellphones, in regard of illuminating backlight devices there is an increasing demand for reduced thickness, reduced weight, enhanced luminance and reduced cost. In response to this demand, there has been proposed an illuminating backlight device using an optical waveguide plate (light guide plate), which is also adopted in liquid crystal displays (LCDs). This device includes an LED light source, and an optical waveguide plate by which light is guided from an end face facing the light source into the inside and is diffused, the diffused light is reflected by a reflective surface disposed at a key part to be illuminated, and the reflected light is projected to the exterior (see Patent Document 3: JP-A 2003-59321). This device is characterized in that LEDs are arranged in a lateral direction, whereby a reduction in thickness is achieved, and the whole surface of the keypad can be illuminated evenly and in high luminance even if the number of LEDs is reduced, as compared with the conventional type in which LEDs are arranged on the back side. Besides, since power consumption is also lowered, reductions in the size and weight of battery are advanced, contributing to a reduction in cost.

The optical waveguide plate for an LCD backlight device is required only to be good in optical characteristics. In contrast, the optical waveguide plate for a keypad illuminating backlight device is required not only to be high in transparency but also to be low in elasticity and in temperature dependence of elasticity, and to be capable of being formed into a smooth-surfaced film with a small and uniform thickness, because it also functions to transmit a key input displacement (click) to a switching element. In general, acrylic resin and polycarbonate resin are high in transparency and good in film forming properties. However, these resins show temperature dependency of elasticity, particularly embrittlement in low temperature regions, so that such a resin may be cracked at the time of key input. In view of this, highly transparent silicone resins applied also as optical material such as potting material for LEDs have been paid attention to (see Patent Document 4: JP-A 2002-265787, Patent Document 5: JP-A 2006-202952, and Patent Document 6: JP-A 2006-342200) because of their excellent low-temperature properties. However, these materials are liquid type materials, so that the process of producing the optical waveguide plate therefrom is intricate, causing a rise in cost.

SUMMARY OF THE INVENTION

The present invention has been made in consideration of the above-mentioned problems in the related art. Accordingly, it is an object of the present invention to provide a millable type silicone rubber composition for an optical sheet, which is excellent in durability to irradiation with sunlight when used as an organic material optical sheet for concentrating solar cells capable of sunlight concentration with monoaxial tracking or without any tracking, which is excellent in calenderability and injection moldability as compared with liquid type materials, which permits easy processing for shaping of a sunlight concentrating section, and which is suitable for obtaining an optical sheet for concentrating solar cells and an optical sheet for LED backlight devices, and to provide an optical sheet obtained by curing the silicone rubber composition.

In order to attain the above object, the present inventors made intensive and extensive investigations. As a result of their investigations, the present inventors found out that when at least a predetermined amount of silica with a specific surface area of more than 200 m²/g is dispersed in a millable type silicone rubber composition for optical sheet, a highly transparent material can be obtained notwithstanding the filling with silica.

According to the present invention, a millable type silicone rubber composition for an optical sheet and an optical sheet as described below are provided.

[1] A millable type silicone rubber composition for an optical sheet comprising as essential components:
(A) 100 parts by weight of an organopolysiloxane represented by the following average compositional formula (I) and having a polymerization degree of at least 100;

$$R^1_a SiO_{(4-a)/2} \qquad (I)$$

wherein $R^1$ are, identical or different, unsubstituted or substituted monovalent hydrocarbon groups, and a is a positive number of 1.95 to 2.05;
(B) 70 to 150 parts by weight of fumed silica having a specific surface area of more than 200 m²/g;
(C) 0.1 to 30 parts by weight of an organohydrogenpolysiloxane having at least two hydrogen atoms bonded to silicon atoms in one molecule; and
(D) 0.1 to 10 parts by weight of a hydrosilylation reaction catalyst.

[2] The silicone rubber composition of [1] which is used for an optical sheet of a concentrating solar cell.

[3] The silicone rubber composition of [1] which is used for an optical sheet of an LED backlight device.

[4] The silicone rubber composition of any one of [1] to [3], wherein component (B) is surface-treated silica.

[5] The silicone rubber composition of [4], wherein an agent for surface treating silica is hexamethyldisilazane.

[6] The silicone rubber composition of any one of [1] to [5], wherein a 2 mm-thick cured sheet of the silicone rubber composition has a total luminous transmittance of at least 90%.

[7] The silicone rubber composition of any one of [1] to [6], wherein a 2 mm-thick cured sheet of the silicone rubber composition has a haze of up to 10.

[8] An optical sheet formed by a cured product of the silicone rubber composition of any one of [1] to [7].

[9] The optical sheet of [8], which is formed by calendering or extrusion molding of the silicone rubber composition of any one of [1] to [7].

ADVANTAGEOUS EFFECTS OF THE INVENTION

The silicone rubber composition according to the present invention is a millable type material which can undergo extrusion molding, and calendering. A cured product of the silicone rubber composition, despite the presence of silica contained therein, is highly transparent and is optimum as an optical sheet for concentrating solar cells and as an optical waveguide plate for a keypad illuminating LED backlight device for cellphones.

DESCRIPTION OF THE EMBODIMENTS

Figure 1:
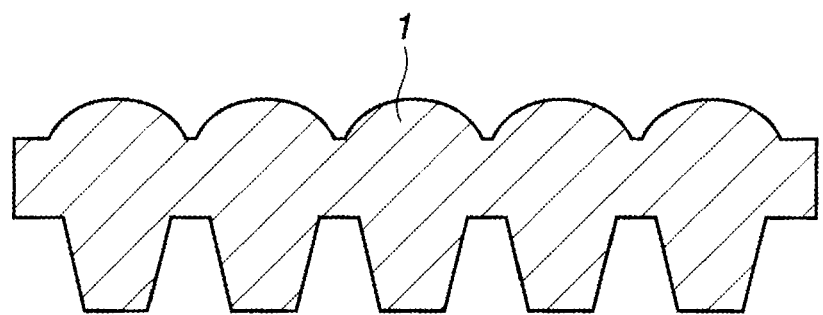
FIG. 1 is a sectional view of an example of an optical sheet of a concentrating solar cell.

In the silicone rubber composition of the present invention, component (A) is an organopolysiloxane represented by the following average compositional formula (I) and having a polymerization degree of at least 100.

$$R^1_a SiO_{(4-a)/2} \qquad (I)$$

wherein $R^1$ are, identical or different, unsubstituted or substituted monovalent hydrocarbon groups, and a is a positive number of 1.95 to 2.05.

In the above average compositional formula (I), $R^1$ are identical or different and unsubstituted or substituted monovalent hydrocarbon groups having 1 to 12 carbon atoms, preferably 1 to 8 carbon atoms. Specific examples of $R^1$ include alkyl groups such as methyl, ethyl, propyl, butyl, hexyl, and octyl; cycloalkyl groups such as cyclopentyl, and cyclohexyl; alkenyl groups such as vinyl, allyl, and propenyl; cycloalkenyl groups; aryl groups such as phenyl, and tolyl; aralkyl groups such as benzyl, and 2-phenylethyl; and groups obtained by substituting one or more of hydrogen atoms in these groups by halogen atom or cyano or other groups. Among these examples, preferred are methyl, vinyl, phenyl, and trifluoropropyl groups, and particularly preferred are methyl and vinyl groups.

Specific and preferred examples of the organopolysiloxane include those in which the main chain of the organopolysiloxane is composed of repetition of dimethylsiloxane unit, and those in which a diphenylsiloxane unit, a methylphenylsiloxane unit, a methylvinylsiloxane unit, or a methyl-3,3,3-trifluoropropylsiloxane unit having a phenyl group, a vinyl group, or a 3,3,3-trifluoropropyl group is introduced into part of a dimethylpolysiloxane structure composed of repetition of the dimethylsiloxane unit constituting the main chain of the organopolysiloxane.

Particularly, the organopolysiloxane preferably has at least two aliphatic unsaturated groups such as alkenyl groups and cycloalkenyl groups in one molecule, and the aliphatic unsaturated group is preferably vinyl. In this case, the aliphatic unsaturated groups preferably account for 0.01 to 20 mol %, particularly 0.02 to 10 mol % of all $R^1$ groups. The aliphatic unsaturated groups may be bonded to silicon atoms at both ends of the molecular chain, or silicon atom at an intermediate position(s) of the molecular chain, or both. The aliphatic unsaturated group is preferably bonded to silicon atoms at both ends of the molecular chain. In addition, a is a positive number of 1.95 to 2.05, preferably 1.98 to 2.02, and more preferably 1.99 to 2.01.

Preferred examples of the organopolysiloxane of component (A) include those in which the molecular chain is terminated with a triorganosiloxy group such as trimethylsiloxy, dimethylphenylsiloxy, dimethylhydroxysiloxy, dimethylvinylsiloxy, methyldivinylsiloxy, and trivinylsiloxy groups.

Particularly preferred examples of the organopolysiloxane include methylvinylpolysiloxane, methylphenylvinylpolysiloxane, and methyltrifluoropropylvinylpolysiloxane.

Such an organopolysiloxane as above can be obtained, for example, by (co-) hydrolytic condensation of one or at least two organohalogenosilanes, or by ring-opening polymerization of a cyclic polysiloxane (trimer or tetramer of siloxane) by use of a basic or acidic catalyst. Fundamentally, these are straight chain diorganopolysiloxanes, and component (A) may be a mixture of two or at least three diorganopolysiloxanes differing in molecular weight (polymerization degree) or molecular structure.

The polymerization degree of the organopolysiloxane is at least 100, preferably 100 to 100,000, and particularly preferably 3,000 to 20,000. The polymerization degree can be measured as weight average polymerization degree in terms of polystyrene by gel permeation chromatography (GPO).

The reinforcing silica having a BET specific surface area of more than 200 m²/g as component (B) is added so as to obtain a rubber composition which is excellent in transparency and in mechanical strength. In this case, for enhancing the transparency of the silicone rubber composition, the BET specific surface area should exceed 200 m²/g, and is preferably at least 250 m²/g. If the BET specific surface area is up to 200 m²/g, the cured product of the rubber composition would show a lowered transparency. The upper limit of the BET specific surface area is not limited, although the upper limit is preferably 500 m²/g.

Normally, examples of silica to be used in silicone rubber compositions include fumed silica and precipitated silica. Use of precipitated silica in the present silicone rubber composition, however, leads to lowered transparency. Therefore, fumed silica is used in the present invention.

In addition, silicas obtained by subjecting the surfaces of the silica to hydrophobicity-imparting treatment with chlorosilane, alkoxysilane or hexamethyldisilazane may also be used suitably. Especially, the treatment with hexamethyldisilazane is preferred, since it promises enhanced transparency.

The silica surface-treating agent such as hexamethyldisilazane may be preliminarily used to treat the surfaces of silica, before blending silica with component (A). Alternatively, the surface-treating agent may be blended at the time of kneading component (A) with silica, and then kneading may be conducted, thereby achieving surface treatment of silica. In this case, the surface-treating agent is preferably used in an amount of 0.1 to 20 parts by weight based on 100 parts by weight of fumed silica.

The reinforcing silica as component (B) is added in an amount of 70 to 150 parts by weight, particularly 70 to 120 parts by weight, based on 100 parts by weight of the organopolysiloxane of component (A). If the addition amount is less than 70 parts by weight, the cured sheet of the silicone rubber composition would show a lowered transparency. If the addition amount exceed 150 parts by weight, it becomes difficult to disperse silica into the silicone polymer.

The organohydrogenpolysiloxane as component (C) in the silicone rubber composition of the present invention has at least two hydrogen atoms bonded to silicon atoms (SiH groups) in one molecule, and the organohydrogenpolysiloxane is represented by the following average compositional formula (II):

$$R^2{}_b H_c SiO_{(4-b-c)/2} \quad (II)$$

wherein $R^2$ is an unsubstituted or substituted monovalent hydrocarbon group of 1 to 6 carbon atoms, preferably having no aliphatic unsaturated bond. Specific examples of $R^2$ include unsubstituted monovalent hydrocarbon groups such as alkyl groups, e.g., methyl, ethyl, propyl, butyl, pentyl, or hexyl, cyclohexyl, cyclohexenyl, and phenyl; and substituted monovalent hydrocarbon groups such as substituted alkyl groups obtained by substituting one or more hydrogen atoms of the above-mentioned monovalent hydrocarbon groups by halogen atom or cyano group, such as 3,3,3-trifluoropropyl, and cyanomethyl. Besides, b is a positive number of 0.7 to 2.1, and c is a positive number of 0.18 to 1.0, with b+c being 0.8 to 3.0. Preferably, b is a positive number of 0.8 to 2.0, and c is a positive number of 0.2 to 1.0, with b+c being 1.0 to 2.5. In addition, the molecular structure of the organohydrogenpolysiloxane may be any of straight chain, cyclic, branched, and three-dimensional network structures. In this case, those in which the number of silicon atoms in one molecule (or polymerization degree) is 2 to 300, particularly 4 to 200, and which are liquid at room temperature may be used suitably. Incidentally, the Si-bonded hydrogen atoms (SiH groups) may be present both ends of the molecular chain or in side chains or both, and the number of SiH groups in one molecule is at least 2 (normally, 2 to 300), preferably at least 3 (e.g., 3 to 200), and more preferably 4 to 150.

Specific examples of the organohydrogenpolysiloxane as component (C) above include: 1,1,3,3-tetramethyldisiloxane; 1,3,5,7-tetramethylcyclotetrasiloxane; methylhydrogencyclopolysiloxane; methylhydrogensiloxane-dimethylsiloxane cyclic copolymer; tris(dimethylhydrogensiloxy)methylsilane; tris(dimethylhydrogensiloxy)phenylsilane; both end trimethylsiloxy-terminated methylhydrogenpolysiloxane; both end trimethylsiloxy-terminated dimethylsiloxane-methylhydrogensiloxane copolymer, both end dimethylhydrogensiloxy-terminated dimethylpolysiloxane, both end dimethylhydrogensiloxy-terminated dimethylsiloxane-methylhydrogensiloxane copolymer; both end trimethylsiloxy-terminated methylhydrogensiloxane-diphenylsiloxane copolymer; both end trimethylsiloxy-terminated methylhydrogensiloxane-diphenylsiloxane-dimethylsiloxane copolymer; cyclic methylhydrogenpolysiloxane; cyclic methylhydrogensiloxane-dimethylsiloxane copolymer; cyclic methylhydrogensiloxane-diphenylsiloxane-dimethylsiloxane copolymer; copolymer composed of $(CH_3)_2HSiO_{1/2}$ units and $SiO_{4/2}$ units; copolymer composed of $(CH_3)_2HSiO_{1/2}$ units and $SiO_{4/2}$ units and $(C_6H_5)SiO_{3/2}$ units; and those obtained by substituting one or more of methyl groups in the above-mentioned exemplary compounds by other alkyl groups (such as ethyl, and propyl) or aryl groups (such as phenyl).

The organohydrogenpolysiloxane is preferably blended in an amount of 0.1 to 30 parts by weight, more preferably 0.1 to 10 parts by weight, and most preferably 0.3 to 10 parts by weight based on 100 parts by weight of the organopolysiloxane of component (A).

The organohydrogenpolysiloxane is preferably blended in such an amount that the molar ratio of the Si-bonded hydrogen atoms (namely, SiH groups) in component (C) to the Si-bonded alkenyl groups in component (A) is from 0.5 to 5 mol/mol, more preferably from 0.8 to 4 mol/mol, and still more preferably from 1 to 3 mol/mol.

As the hydrosilylation reaction catalyst of component (D), known ones are applicable. Examples of the hydrosilylation reaction catalyst include platinum catalysts such as platinum black, platinic chloride, chloroplatinic acid, reaction products of chloroplatinic acid with monohydric alcohol, and complexes of chloroplatinic acid with olefin, and platinic bisacetoacetate; palladium catalysts; and rhodium catalysts. Incidentally, the hydrosilylation reaction catalyst may be used in a catalytic amount, normally 0.1 to 10 parts by weight as platinum family metal, based on 100 parts by weight of component (A).

Other than the above-mentioned component, the silicone rubber composition of the present invention may contain a flame retarder and a colorant within such ranges as not to injure the object of the present invention.

The silicone rubber composition of the present invention can be obtained by kneading predetermined amounts of the above-mentioned components by twin roll, a kneader, or a Banbury mixer.

In molding the silicone rubber composition of the present invention, the molding method is not particularly restricted; for example, press molding, extrusion, and calendering are applicable.

In addition, the curing conditions are not particularly limited. Generally, curing can be conducted by heating at a temperature of 80 to 300° C., particularly 100 to 250° C., for about 5 seconds to 1 hour, particularly 30 seconds to 30 minutes. Besides, postcure may be conducted at about 100 to 200° C. for about 10 minutes to 10 hours.

When the silicone rubber composition of the present invention is molded by such a method as press molding and then cured, highly transparent silicone rubber products are obtained, which may be used suitably as, for example, an optical waveguide plate of a keypad illuminating backlight device for cellphones.

In addition, a 2 mm-thick cured sheet of the silicone rubber composition preferably has a total luminous transmittance of at least 90%, as measured by a direct-reading Haze Computer HGM-2 produced by Suga Test Instruments Co., Ltd. If the total luminous transmittance is less than 90%, the use of the cured sheet as an optical waveguide plate results in that light is diffused too greatly, and the incident light cannot reach a remotest part in the optical waveguide plate, leading to unevenness of luminance.

Furthermore, a 2 mm-thick cured sheet of the silicone rubber composition preferably has a haze of up to 10, particularly up to 8, as measured by a direct-reading Haze Computer HGM-2 produced by Suga Test Instruments Co., Ltd. If the haze exceeds 10, the use of the cured sheet as an optical waveguide plate results in that light is diffused too greatly, and the incident light cannot reach a remotest part in the optical waveguide plate, leading to unevenness of luminance.

The silicone rubber composition of the present invention is for an optical sheet, and is suitably applicable as a concentrating (condensing) type optical sheet, particularly, an optical sheet of a condensing solar cell and as an optical sheet of an LED backlight device. As for the shape of an optical sheet of a concentrating solar cell, a microlens sheet or prism lens sheet for aligning the incidence of sunlight to a normal direction, prior to incidence on a prism sheet, for aligning the sunlight into the direction normal to the Fresnel lens sheet is also a mode for carrying out the present invention. In addition, a convex lens sheet or Fresnel lens sheet for concentrating (condensing) light is also a mode for carrying out the present invention. Further, a prism lens sheet for spatially dispersing the light emitted from an LED deemed as a point light source, in an LED backlight device, is also a mode for carrying out the present invention. An optical sheet to which rubber elasticity is imparted, in a keypad switch improved in operability in the dark by emission of illuminating light from the back side, is also a mode for carrying out the present invention. Thus, insofar as the light from a specific light source can be reflected, refracted or transmitted by an optical sheet of a desired shape and desired emitted light can thereby be obtained, the shape of the optical sheet is not to be restricted; in other words, any shape that can be formed by calendering or extrusion molding which is excellent in productivity is a mode for carrying out the present invention.

Figure 2:
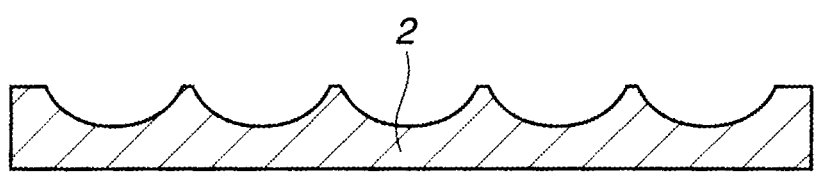
FIG. 2 is a sectional view of an example of an optical sheet of an LED backlight device.

Incidentally, FIG. 1 shows a nonlimitative example of an optical sheet 1 of a concentrating solar cell, and FIG. 2 shows a nonlimitative example of an optical sheet 2 of an LED backlight device.

EXAMPLES

Now, the present invention will be described specifically by way of Examples and Comparative Examples, but the invention is not to be restricted by the following Examples. Incidentally, the unit of the amounts of materials blended is parts by weight. In addition, weight average molecular weight and weight average polymerization degree are measurements in terms of polystyrene obtained by gel permeation chromatography (GPC).

Example 1

A mixture of 100 parts of an organopolysiloxane containing 99.425 mol % of dimethylsiloxane units, 0.50 mol % of methylvinylsiloxane units, and 0.025 mol % of dimethylvinylsiloxane units and having an average polymerization degree of about 6,000, 70 parts of silica (trade name: AEROSIL 300, produced by Nippon Aerosil Co., Ltd.) having a BET specific surface area of 300 $m^2/g$, 16 parts of hexamethyldisilazane as dispersant, and 4 parts of water was kneaded by a kneader, followed by heat treatment at 170° C. for 2 hours, to prepare a compound.

To 100 parts of the above compound, 0.5 parts/2.0 parts of C-25A (platinum catalyst)/C-25B (organohydrogenpolysiloxane) (both produced by Shin-Etsu Chemical Co., Ltd.) as an addition crosslinking curing agent was added after kneading by twin roll, and the admixture was blended uniformly. The blended composition was press cured at 120° C. and 70 $kgf/cm^2$ for 10 minutes, followed by postcure at 200° C. for 4 hours, to produce a test sheet.

Example 2

A sheet was produced in the same manner as in Example 1, except that 80 parts of silica (trade name: AEROSIL 300, produced by Nippon Aerosil Co., Ltd.) having a BET specific surface area of 300 $m^2/g$, 18.5 parts of hexamethyldisilazane and 4.6 parts of water were used.

Example 3

A sheet was produced in the same manner as in Example 1, except that 100 parts of silica (trade name: AEROSIL 300, produced by Nippon Aerosil Co., Ltd.) having a BET specific surface area of 300 $m^2/g$, 23 parts of hexamethyldisilane and 5.7 parts of water were used.

Example 4

A sheet was produced in the same manner as in Example 1, except that 70 parts of silica (trade name: AEROSIL 380, produced by Nippon Aerosil Co., Ltd.) having a BET specific surface area of 380 $m^2/g$, 20.3 parts of hexamethyldisilazane and 5.1 parts of water were used.

Comparative Example 1

A sheet was produced in the same manner as in Example 1, except that 50 parts of silica (trade name: AEROSIL 300, produced by Nippon Aerosil Co., Ltd.) having a BET specific surface area of 300 m²/g, 11.4 parts of hexamethyldisilazane and 2.9 parts of water were used.

Comparative Example 2

A sheet was produced in the same manner as in Example 1, except that 70 parts of silica (trade name: AEROSIL 200, produced by Nippon Aerosil Co., Ltd.) having a BET specific surface area of 200 m²/g, 16 parts of hexamethyldisilazane and 4 parts of water were used.

The rubber compositions and the sheets obtained above were put to measurement of plasticity number, hardness, total luminous transmittance, and haze. The results are shown in Table 1 below.

Measuring Method for Physical Properties

Plasticity number was measured according to JIS K6249.

Each rubber composition was cured by heating at 120° C. for 10 minutes, and hardness (Durometer A) was measured according to JIS K6249.

Transparency Evaluation Methods: A 2 mm-thick sheet was put to measurement of total luminous transmittance and haze (by use of direct-reading Haze Computer HGM-2, produced by Suga Test Instruments Co., Ltd.).

TABLE 1

|  | Example | | | | Comparative Example | |
| --- | --- | --- | --- | --- | --- | --- |
|  | 1 | 2 | 3 | 4 | 1 | 2 |
| Plasticity number | 435 | 536 | 720 | 460 | 250 | 390 |
| Hardness (Durometer A) | 68 | 71 | 75 | 71 | 60 | 64 |
| Total luminous transmittance | 93.4 | 93.5 | 92.6 | 92.2 | 88.4 | 88 |
| Haze | 6.3 | 6.0 | 4.8 | 6.2 | 11.7 | 10.3 |

Japanese Patent Application No. 2010-291823 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A concentrating solar cell including an optical sheet comprising a millable type silicone rubber composition for an optical sheet comprising as essential components:
  (A) 100 parts by weight of an organopolysiloxane represented by the following average compositional formula (I) and having a polymerization degree of 3,000 to 20,000;

$$R^1_a SiO_{(4-a)/2} \qquad (I)$$

wherein $R^1$ are, identical or different, unsubstituted or substituted monovalent hydrocarbon groups, and a is a positive number of 1.95 to 2.05, and wherein the organopolysiloxane further has at least two aliphatic unsaturated groups in one molecule;
  (B) 70 to 150 parts by weight of surface-treated fumed silica having a specific surface area of more than 200 m²/g wherein the fumed silica is surface-treated with hexamethyldisilazane;
  (C) 0.1 to 30 parts by weight of an organohydrogenpolysiloxane having at least two hydrogen atoms bonded to silicon atoms in one molecule; and
  (D) 0.1 to 10 parts by weight of a hydrosilylation reaction catalyst,
  wherein a 2 mm-thick cured sheet of the silicone rubber composition has a total luminous transmittance of at least 90%.

2. The concentrating solar cell of claim 1, wherein a 2 mm-thick cured sheet of said silicone rubber composition has a haze of up to 10.

3. The concentrating solar cell of claim 1, wherein said optical sheet is formed by a cured product of the silicone rubber composition.

4. The concentrating solar cell of claim 3, wherein said optical sheet is formed by calendering or extrusion molding of said silicone rubber composition.

5. An LED backlight device including an optical sheet comprising a millable type silicone rubber composition for an optical sheet comprising as essential components:
  (A) 100 parts by weight of an organopolysiloxane represented by the following average compositional formula (I) and having a polymerization degree of 3,000 to 20,000;

$$R^1_a SiO_{(4-a)/2} \qquad (I)$$

wherein $R^1$ are, identical or different, unsubstituted or substituted monovalent hydrocarbon groups, and a is a positive number of 1.95 to 2.05, and wherein the organopolysiloxane further has at least two aliphatic unsaturated groups in one molecule;
  (B) 70 to 150 parts by weight of surface-treated fumed silica having a specific surface area of more than 200 m²/g wherein the fumed silica is surface-treated with hexamethyldisilazane;
  (C) 0.1 to 30 parts by weight of an organohydrogenpolysiloxane having at least two hydrogen atoms bonded to silicon atoms in one molecule; and
  (D) 0.1 to 10 parts by weight of a hydrosilylation reaction catalyst,
  wherein a 2 mm-thick cured sheet of the silicone rubber composition has a total luminous transmittance of at least 90%.

6. The LED backlight device of claim 5, wherein a 2 mm-thick cured sheet of said silicone rubber composition has a haze of up to 10.

7. The LED backlight device of claim 5, wherein said optical sheet is formed by a cured product of said silicone rubber composition.

8. The LED backlight device of claim 7 wherein said optical sheet is formed by calendering or extrusion molding of said silicone rubber composition.

* * * * *